United States Patent [19]

Berghmans

[11] 4,287,112

[45] Sep. 1, 1981

[54] COATING OF POLY(ARYLENE SULFIDE), FLUOROPOLYMER AND ALUMINUM FLAKE

[75] Inventor: Jacques M. L. Berghmans, Lint, Belgium

[73] Assignee: E. I. Du Pont de Nemours and Company, Wilmington, Del.

[21] Appl. No.: 111,039

[22] Filed: Jan. 10, 1980

[30] Foreign Application Priority Data

Nov. 16, 1979 [WO] PCT Int'l Appl. .................. PCT/US79/00985

[51] Int. Cl.$^3$ .............................................. C08L 27/12
[52] U.S. Cl. ........................... 260/29.6 F; 260/33.4 F; 260/42.22; 428/422
[58] Field of Search ...................... 260/29.6 F, 31.8 F, 260/33.4 F, 33.6 F, 33.8 F, 42.22; 428/422

[56] References Cited

U.S. PATENT DOCUMENTS

| | | | |
|---|---|---|---|
| 3,622,376 | 11/1971 | Tieszen | 260/29.6 F |
| 3,701,665 | 10/1972 | Grimes | 260/29.6 F |
| 3,856,735 | 12/1974 | Blackwell | 260/33.4 F |
| 3,856,736 | 12/1974 | Tieszen | 260/33.4 F |
| 3,857,852 | 12/1974 | Tieszen | 260/33.4 F |
| 3,993,843 | 11/1976 | Vasta | 428/422 |
| 4,123,401 | 10/1978 | Berghmans | 260/29.6 F |
| 4,145,326 | 3/1979 | Blackwell | 260/29.6 F |

*Primary Examiner*—Paul R. Michl
*Attorney, Agent, or Firm*—Richard H. Burgess

[57] ABSTRACT

A coating composition of poly(arylene sulfide), fluoropolymer and aluminum flake, in a liquid carrier which is either aqueous or organic, provides durable coatings especially useful in bakeware.

9 Claims, No Drawings

COATING OF POLY(ARYLENE SULFIDE), FLUOROPOLYMER AND ALUMINUM FLAKE

BACKGROUND OF THE INVENTION

This invention relates to non-stick coating compositions particularly useful on cookware.

Poly(phenylene sulfide) resins are known for use in cookware coatings. Sometimes fluoropolymers and pigments, extenders or hardening agents such as titanium dioxide and aluminum dioxide are used. Although such coatings are useful on bakeware intended for use in an oven at lower and more uniform temperatures such as used in baking bread, they are generally not as hard nor as durable as desired for top-of-range cookware and for electrical appliances such as waffle irons.

SUMMARY OF THE INVENTION

The present invention provides a coating composition comprising, in weight percentage ranges based on the solids content, about:

(a) 95–35% poly(arylene sulfide) resin,
(b) 5–55% fluoropolymer polymerized or copolymerized from monomers selected from one or more monoethylenically unsaturated hydrocarbon monomers and hydrocarbon ether monomers, said monomers being completely substituted with fluorine atoms or a combination of fluorine atoms and chlorine atoms,
(c) 0.5–20% aluminum flake, and
(d) 0–40% titanium dioxide pigment, dispersed in liquid carrier.

The liquid carrier can be aqueous or organic. The poly(arylene sulfide) resin is preferably poly(phenylene sulfide) resin. The fluoropolymer is preferably polytetrafluoroethylene, but it can also be a perfluorinated copolymer of hexafluoropropylene and tetrafluoroethylene or a copolymer of tetrafluoroethylene and hydrocarbon ether monomers which have been completely substituted with fluorine atoms.

The invention also comprises articles of cookware, such as bakeware, coated with such coating compositions and heated to remove the liquid carrier and more or less coalesce the coating.

DETAILED DESCRIPTION

Applicant has discovered that aluminum flake can substantially increase the hardness at elevated temperatures of coating compositions of poly(arylene sulfide) resins and fluoropolymers, with optional titanium dioxide pigment. Such coating compositions have liquid carriers which are either aqueous or organic.

Applicable arylene sulfide polymers include polymers of the type which are prepared as described in U.S. Pat. No. 3,354,129. As disclosed in this patent, these polymers can be prepared by reacting a polyhalo-substituted cyclic compound containing unsaturation between adjacent ring atoms and an alkali metal sulfide in a polar organic compound. The resulting polymer contains the cyclic structure of the polyhalo-substituted compound coupled in repeating units through a sulfur atom. The polymers which are preferred for use in the coating procedure of this invention, because of their high thermal stability and availability of the materials from which they are prepared, are those polymers having the repeating unit —R—S— where R is phenylene, biphenylene, naphthylene, biphenyl ether, or a lower alkyl-substituted derivative thereof. By "lower alkyl" is meant alkyl groups having 1 to 6 carbon atoms such as methyl, ethyl, propyl, isobutyl, hexyl, and the like. Preferably the arylene sulfide polymers have melting temperatures within the range of about 205°–483° C. If desired, the arylene sulfide polymer can be lightly cured, i.e., the molecular weight of the polymer can be increased by cross-linking or chain extension, e.g., by heating moderately, prior to application to the substrate.

A variety of fluoropolymers can be used, including those of U.S. Pat. No. 4,123,401 and U.S. Patent application Ser. No. 956,349, filed Oct. 31, 1978, equivalent to Patent Cooperation Treaty International Application US79/00807, filed Oct. 1, 1979, designating Japan along with other countries. All of the patents and applications cited herein are hereby incorporated by reference.

Preferably poly(phenylene sulfide) resin (PPS) is used in a weight ratio to fluoropolymer of about 80:20. Titanium dioxide pigment in an amount of about 15 parts by weight per 100 parts of poly(phenylene sulfide) resin plus fluoropolymer is helpful in further hardening the coating. The fluoropolymer is preferably either polytetrafluoroethylene (PTFE) such as an irradiated micropowder, or a copolymer of about 80 weight percent tetrafluoroethylene and 20 weight percent hexafluoropropylene (FEP).

Although various types of aluminum flake can be used in organic solvent, water tends to react with untreated aluminum flake, causing gassing. Thus, for aqueous compositions, preferably the aluminum flake has been reacted with phosphate ester or emulsified with fatty acid and neutralized to form a morpholine salt.

The invention will now be illustrated by examples. Parts, percentages and proportions herein are by weight except where indicated otherwise.

EXAMPLE 1

Solvent-Based 66.6 PPS/17 FEP/12.75 $TiO_2$/3.65 Al Flake

Prepare a premix by grinding in a pebble mill for 48 hours or grinding in a Dyno-mill for 5 passes a blend of:

| | |
|---|---|
| "Ryton" V-I PPS resin from Phillips Petroleum Co. | 22.16 |
| FEP powder from Du Pont | 5.65 |
| "Tipure R 900" $TiO_2$ pigment from Du Pont | 4.24 |
| "Triton X-100" from Rohm & Haas (isooctylphenoxy-polyethoxyethanol) | 6.14 |
| Channel black (carbon colorant) | 2.00 |
| Cobalt blue pigment | 0.50 |
| Odorless kerosene | 29.66 |
| Butylcellosolve | 29.65 |
| | 100.00 |

This premix is then mixed in the following proportions:

| | |
|---|---|
| Premix | 96.44 |
| Aluminum flake | 1.78 |
| "Solvesso 150" from Exxon - fraction of petroleum distillate - mainly aromatics | 1.78 |

The coating composition is applied to a substrate of any suitable material such as aluminum by suitable techniques such as spraying or roller coating. The coating is cured by heating 10 minutes at 400° C. This drives off the liquid carrier and coalesces into a desirable coating. Alternately, the coating can be cured at 370° C. for 15 minutes, at 425° C. for 5–7 minutes or under equivalent conditions.

EXAMPLE 2

Aqueous 66.6 PPS/17 FEP/12.75 TiO$_2$/3.65 Al Flake

Make a premix as in Example 1 from:

| | |
|---|---|
| "Ryton V-I" PPS resin | 33.76 |
| PTFE micropowder Du Pont "DLX 6000" or ICI "Fluon L170" | 8.44 |
| Channel black (carbon colorant) | 1.94 |
| "Tipure R 900" | 6.33 |
| "Triton X-100" | 4.94 |
| Demineralized water | 44.59 |
| | 100.00 |

This premix is then mixed in the following proportions:

| | |
|---|---|
| Premix | 73.80 |
| Aluminum flake pigment paste XP24050 from Claremont Polychemical Co., Old Bethpage, N.Y., U.S.A., premixed with | 1.31 |
| demineralized water and | 1.00 |
| "Triton X-100" | 0.31 |
| Demineralized water | 18.04 |
| "Cemulsol ES" from Rhone-Poulenc condensation product of ethylene oxide and alkyl phenol | 5.54 |
| | 100.00 |

(1.31, 1.00, 0.31 are Premixed)

These coating compositions are applied and cured as in Example 1.

COMPARATIVE TEST

Two coating compositions were prepared and applied as in Example 1, differing in that one contained the aluminum flake of Example 1 while the other did not. The hardness of the two coatings was compared at elevated temperatures by the Erichsen technique described, inter alia, in the article by Weinmann entitled "Ein neues Gerät zur Härtemessung von Antrichen und anderen Schutzüberzügen", published in Farbe und Lack, 68, No. 5, 323–326 (1962). The results in the following table demonstrate advantages of the invention.

| Temperature (°C.) | Erichsen Hardness (grams) | |
|---|---|---|
| | No Flake | With Flake |
| 100 | 600 | 2000 |
| 130 | 400 | 2000 |
| 150 | | 2000 |
| 170 | 300 | |
| 190 | 250 | 1400 |
| 230 | 180 | 800 |
| 260 | | 500 |
| 270 | 100 | |
| 280 | | 250 |
| 300 | 90 | |
| 325 | | 150 |
| 390 | | 100 |

I claim:

1. A coating composition comprising, in weight percentage ranges based on the solids content, about:
   (a) 95–35% poly(arylene sulfide) resin,
   (b) 5–55% fluoropolymer polymerized or copolymerized from monomers selected from one or more monoethylenically unsaturated hydrocarbon monomers and hydrocarbon ether monomers, said monomers being completely substituted with fluorine atoms or a combination of fluorine atoms and chlorine atoms,
   (c) 0.5–20% aluminum flake, and
   (d) 0–40% titanium dioxide pigment, dispersed in liquid carrier.
2. The coating composition of claim 1 wherein the poly(arylene sulfide) of (a) is poly(phenylene sulfide).
3. The coating composition of claim 2 wherein the liquid carrier is aqueous.
4. The coating composition of claim 2 wherein the liquid carrier is organic.
5. The coating composition of claim 2 containing, by weight, about:
   (a) 66.6% poly(phenylene sulfide) resin,
   (b) 17% polytetrafluoroethylene,
   (c) 3.65% aluminum flake, and
   (d) 12.75% titanium dioxide pigment, dispersed in organic liquid carrier.
6. The coating composition of claim 2 wherein the fluoropolymer of (b) is polytetrafluoroethylene.
7. The coating composition of claim 2 wherein the fluoropolymer of (b) is a perfluorinated copolymer of hexafluoropropylene and tetrafluoroethylene.
8. The coating composition of claim 2 wherein the fluoropolymer of (b) is a copolymer of tetrafluoroethylene and hydrocarbon ether monomers which have been completely substituted with fluorine atoms.
9. An article of cookware having a substrate and a coating produced by applying a coating composition of claim 1 to the substrate, and heating the coated substrate to remove the liquid carrier and coalesce the coating.

* * * * *